(12) United States Patent
Pinho et al.

(10) Patent No.: US 11,182,321 B2
(45) Date of Patent: Nov. 23, 2021

(54) SEQUENTIALITY CHARACTERIZATION OF INPUT/OUTPUT WORKLOADS

(71) Applicant: EMC IP Holding Company LLC, Hopkinton, MA (US)

(72) Inventors: Rômulo Teixeira de Abreu Pinho, Niterói (BR); Hugo de Oliveira Barbalho, Rio de Janeiro (BR); Vinícius Michel Gottin, Rio de Janeiro (BR); Roberto Nery Stelling Neto, Rio de Janeiro (BR); Alex Laier Bordignon, Niterói (BR); Daniel Sadoc Menasché, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/671,617

(22) Filed: Nov. 1, 2019

(65) Prior Publication Data
US 2021/0133134 A1  May 6, 2021

(51) Int. Cl.
*G06F 13/362* (2006.01)

(52) U.S. Cl.
CPC ................ *G06F 13/3625* (2013.01)

(58) Field of Classification Search
CPC ............. G06F 13/3625; G06F 13/14
See application file for complete search history.

(56) References Cited

U.S. PATENT DOCUMENTS

| | | | |
|---|---|---|---|
| 6,092,149 A | 7/2000 | Hicken et al. | |
| 7,359,890 B1 | 4/2008 | Ku et al. | |
| 8,429,351 B1 * | 4/2013 | Yu | G06F 12/0862 |
| | | | 711/132 |
| 8,667,224 B1 | 3/2014 | Yu et al. | |
| 9,547,459 B1 | 1/2017 | BenHanokh et al. | |
| 10,001,927 B1 | 6/2018 | Trachtman et al. | |
| 2001/0016897 A1 * | 8/2001 | Bates, Jr. | G06F 12/0862 |
| | | | 711/137 |

(Continued)

OTHER PUBLICATIONS

Atzori et al., "The Internet of Things: A survey," Computer Networks, 54 (2010) 2787-2805.

(Continued)

*Primary Examiner* — Idriss N Alrobaye
*Assistant Examiner* — Ronald T Modo
(74) *Attorney, Agent, or Firm* — Ryan, Mason & Lewis, LLP

(57) ABSTRACT

Techniques are provided for characterizing and quantifying a sequentiality of workloads using sequentiality profiles and signatures. One exemplary method comprises obtaining telemetry data for an input/output workload; evaluating a distribution over time of sequence lengths for input/output requests in the telemetry data by the input/output workload; and generating a sequentiality profile for the input/output workload to characterize the input/output workload based at least in part on the distribution over time of the sequence lengths. Multiple sequentiality profiles for one or more input/output workloads may be clustered into a plurality of clusters. A sequentiality signature may be generated to represent one or more sequentiality profiles within a given cluster. A performance of data movement policies may be evaluated with respect to the sequentiality signature of the given cluster.

20 Claims, 13 Drawing Sheets

(56) References Cited

U.S. PATENT DOCUMENTS

| | | | |
|---|---|---|---|
| 2003/0028694 | A1 | 2/2003 | Aboulenein |
| 2007/0214325 | A1 | 9/2007 | Sasamoto et al. |
| 2008/0229027 | A1* | 9/2008 | Shioya .............. G06F 12/0862 711/137 |
| 2008/0229071 | A1 | 9/2008 | Shioya et al. |
| 2009/0063778 | A1 | 3/2009 | Nomura |
| 2010/0199036 | A1 | 8/2010 | Siewert et al. |
| 2011/0202717 | A1 | 8/2011 | Kezuka et al. |
| 2014/0052928 | A1 | 2/2014 | Shimoi |
| 2015/0074328 | A1* | 3/2015 | Baryudin ............ G06F 3/0665 711/103 |
| 2015/0324135 | A1* | 11/2015 | Chan .................... G06F 3/0653 711/114 |
| 2016/0098212 | A1* | 4/2016 | Tokoyoda .............. G11C 7/00 711/154 |
| 2016/0154750 | A1 | 6/2016 | Park |
| 2017/0123988 | A1 | 5/2017 | Chun |
| 2018/0067961 | A1 | 3/2018 | Fang et al. |

OTHER PUBLICATIONS

Schooler et al., "Architectural Vision for a Data-Centric IoT: Rethinking Things, Trust and Clouds," In Distributed Computing Systems (ICDCS), 2017 IEEE 37th International Conference on (pp. 1717-1728). IEEE.
Bonomi et al., "Fog computing and its role in the internet of things," In Proceedings of the first edition of the MCC workshop on Mobile cloud computing (pp. 13-16). ACM, 2012.
Shi et al., "Edge computing: Vision and challenges," IEEE Internet of Things Journal, 3(5), 637-646.
Mahadev et al., "The Case for VM-Based Cloudlets in Mobile Computing, Pervasive Computing," IEEE, 8 (2009) 14-23.
Morabito et al., "Consolidate IoT edge computing with lightweight virtualization," IEEE Network, 32(1), 102-111.
Ismail et al., "Evaluation of docker as edge computing platform," In Open Systems (ICOS), 2015 IEEE Confernece on (pp. 130-135). IEEE.
Mahmud et al., "Fog computing: A taxonomy, survey and future directions," In Internet of Everything (pp. 103-130). Springer, Singapore.
Inaba et al., "Applications of weighted Voronoi diagrams and randomization to variance-based k-clustering," In Proceedings of the tenth annual symposium on Computational geometry (pp. 332-339). ACM.
Thönes, J. "Microservices." IEEE Software 32.1 (2015): 116-116.
Lewis et al., "Microservices," Available in: http://martinfowler.com/articles/microservices.html. Access in: Sep. 27, 2017.
Pahl et al., "Containers and clusters for edge cloud architectures—a technology review," In Future Internet of Things and Cloud (FiCloud), 2015 3rd International Conference on (pp. 379-386) IEEE.
Misra et al., "On Theoretical Modeling of Sensor Cloud: A Paradigm Shift From Wireless Sensor Network," IEEE Systems Journal, vol. 11, No. 2, pp. 1084-1093, Jun. 2017.
Taleb et al., "Mobile edge computing potential in making cities smarter," IEEE Communications Magazine, 55(3), 38-43.
Bouzeghoub, M., "A framework for analysis of data freshness," In Proceedings of the 2004 international workshop an Information quality in information systems (pp. 59-67). ACM.
"CEP," Available in: https://en.wikipedia.org/wiki/Complex_event_processing.
"Publish-subscribe pattern," Available in: https://en.wikipedia.org/wiki/Publish%E2%80%93subscribe_pattern.
Chatterjee et al., "Optimal Composition of a Virtual Sensor for Efficient Virtualization within Sensor-Cloud," in Proceedings of IEEE International Conferencce on Communications, Jun. 2015, pp. 448-453.
Yi et al., "A survey of fog computing: concepts, applications and issues." Proceedings of the 2015 Workshop on Mobile Big Data. ACM, 2015.
Santos et al., "Olympus: The cloud of sensors," IEEE Cloud Computing, 2(2), 48-56.
Delicato et al.,. "The Resource Management Challenge in IoT," In Resource Management for Internet of Things (pp. 7-18). Springer International Publishing (2017).
Wang et al., "ENORM: A framework for edge node resource management," IEEE Transactions on Services Computing (2017).
Skarlat et al., "Resource Provisioning for IoT Services in the Fog," 2016 IEEE 9th International Conference on Service-Oriented Computing and Applications (SOCA), Macau, 2016, pp. 32-39.
Roy et al., "DIVISOR: Dynamic Virtual Sensor Formation for Overlapping Region in IoT-based Sensor-Cloud," Proceedings of the IEEE Wireless Communications and Networking Conference, 2018.
Skarlat et al., "Optimized IoT service placement in the fog," Serv. Oriented Comput. AppL 11, 4 (Dec. 2017), 127-443. DOI: https://doi.org/10.1007/s11761-017-0219-8 (2017).
Dautov et al., "Pushing Intelligence to the Edge with a Stream Processing Architecture," 2017 IEEE International Conference on Internet of Things (iThings) and IEEE Green Computing and Methods and Apparatus for Real-Time Anomaly Detection over Sets of Time Series—Nov. 2017 Dell EMC Confidential p. 24 of 24 Communications (GreenCom) and IEEE Cyber, Physical and Social Computing (CPSCom) and IEEE Smart Data (SmartData), Exeter, 2017, pp. 792-799.
"Hypervisor," Available in: https://en.wikipedia.org/wiki/Hypervisor.
"EdgeX Foundry," Available in: https://www.edgexfoundry.org.
"Orion Context Broker," Available in: https://catalogue.fiware.org/enablers/publishsubscribe-context-broker-orion-context-broker.
"FIWARE NGSI Open RESTful API Specification," Available in: http://forge.fiware.org/plugins/mediawiki/wiki/fiware/ndex.php/FIWARE_NGSI_Open_RESTful_API_Specification. Last accessed: Jun. 28, 2018.
"ZeroMQ," Available in: https://en.wikipedia.org/wiki/ZeroMQ.
D. Merkel, "Docker: Lightweight Linux Containers for Consistent Development and Deployment," Linux Journal, vol. 2, p. 234, (2014).
K. Hornik, "Approximation capabilities of multilayer feedforward networks," Neural networks, vol. 2, No. 4, pp. 251-257, 1991.
Betts, et al., "Estimating the WCET of GPU-accelerated applications using hybrid analysis," Real-Time Systems (ECRTS), 2013.
U.S. Appl. No. 15/941,434, entitled, "Allocation of Shared Computing Resources Using Source Code Feature Extraction and Machine Learning", filed Mar. 30, 2018.
U.S. Appl. No. 16/039,743, entitled, "Allocation of Shared Computing Resources Using Source Code Feature Extraction and Clustering-Based Training of Machine Learning Models", filed Jul. 19, 2018.
U.S. Appl. No. 16/259,244, entitled, Building Neural Networks for Resource Allocation for Iterative Workloads Using Reinforcement Learning, filed Jan. 28, 2019.
U.S. Appl. No. 16/034,432, entitled, "Resource Allocation and Provisioning in a Multi-Tier Edge-Cloud Virtualization Environment", filed Jul. 13, 2018.
U.S. Appl. No. 16/508,347 entitled, "Real-Time Pre-Fetch Determinaton Based on LUN-specific Sequential Patterns," filed Jul. 11, 2019.
U.S. Appl. No. 16/397,596 entitled, "Adaptive Look-Ahead Configuration for Prefetching Data in Input/Output Operations Based on Request Size and Frequency," filed Apr. 29, 2019.
U.S. Appl. No. 16/263,135 entitled, "Adaptive Look-Ahead Configuration for Prefetching Data in Input/Output Operations," filed Jan. 31, 2019.
Ester et al., "A density-based algorithm for discovering clusters in large spatial databases with noise," in Proceedings of the Second International Conference on Knowledge Discovery and Data Mining (KDD-96), 1996.
Van Der Maaten et al., "Visualizing Data Using t-SNE," Journal of Machine Learning Research, vol. 9, pp. 2579-2605, 2008.

* cited by examiner

Storage Telemetry Data 200

| | ID | FILEID | TIME | OPN | CPU | TDEV | LBA | SIZE |
|---|---|---|---|---|---|---|---|---|
| 0 | 606 | 0 | 33028 | Write | 61 | 166 | 4246591162 | 1 |
| 1 | 702 | 0 | 37843 | Write | 77 | 166 | 4246591163 | 1 |
| 2 | 1494 | 0 | 96355 | Write | 45 | 166 | 4246591164 | 1 |
| 3 | 1857 | 0 | 119314 | Write | 61 | 166 | 2015795053 | 1 |
| 4 | 1909 | 0 | 122740 | Write | 29 | 166 | 2015795054 | 1 |
| 5 | 1926 | 0 | 124447 | Write | 45 | 166 | 2015795055 | 1 |

FIG. 2

```python
def find_sequences(addresses, gap=1):
    '''
    find sequences in a sorted list of unique addresses, allowing a gap
    between subsequent addresses. The gap enables us to take into account
    the average size of the requests associated with the given addresses.

addresses: sorted list of unique addresses
    gap: allowed gap between subsequent addresses
    '''
    length = 1
    start = addresses[0]

# accumulate sequences in a list
    seq = [[start, length]]

# traverse all values in given address list
    for i in range(1, len(addresses)):
        d = addresses[i]-addresses[i-1] # compute difference from previous value
        if d <= gap: # if diff within allowed gap
            length += d # add difference to total sequence length
        else:
            seq[-1][1] = length # complete current sequence
            length = 1
            start = addresses[i]
            seq.append([start, length]) # create new sequence return all formed sequences
    return seq
```

FIG. 5

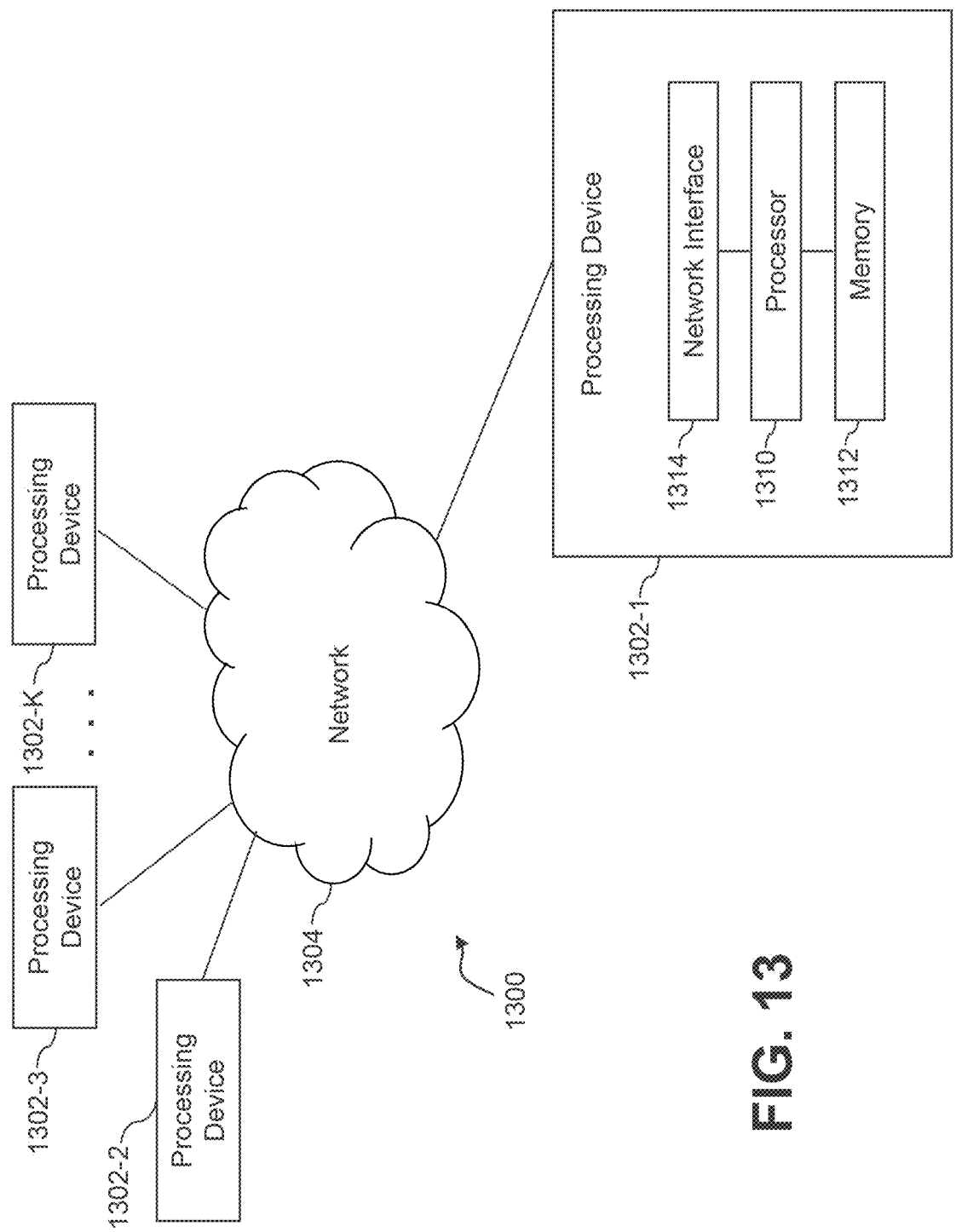

SEQUENTIALITY CHARACTERIZATION OF INPUT/OUTPUT WORKLOADS

FIELD

The field relates generally to techniques for characterizing input/output operations of a workload.

BACKGROUND

Prefetching is a well-known data movement technique to optimize cache behavior in conjunction with an analysis of input/output (I/O) workload traces. Prefetching exploits data locality with an assumption that applications often request data residing in sequential addresses in a given address space. Even though prefetching generally yields good results, prefetching is dependent on a correct choice of when and how much data to prefetch, leading to cache pollution and unnecessary cache evictions when a poor choice is made. This choice, in turn, is highly dependent on how the applications that access the storage device traverse the address space when requesting data.

A need therefore exists for improved techniques for characterizing and quantifying the access patterns of workloads using input/output (I/O) workload traces.

SUMMARY

In one embodiment, a method comprises obtaining telemetry data for an I/O workload; evaluating a distribution over time of sequence lengths for I/O requests in the telemetry data by the I/O workload; and generating a sequentiality profile for the I/O workload to characterize the I/O workload based at least in part on the distribution over time of the sequence lengths.

In some embodiments, a plurality of sequentiality profiles for one or more I/O workloads are clustered into a plurality of clusters. A sequentiality signature can be generated to represent one or more sequentiality profiles within a given cluster. A performance of at least one data movement policy can be evaluated with respect to the sequentiality signature of the given cluster.

Other illustrative embodiments include, without limitation, apparatus, systems, methods and computer program products comprising processor-readable storage media.

BRIEF DESCRIPTION OF THE DRAWINGS

FIG. 2 illustrates an exemplary table of storage telemetry data in the form of I/O traces for requests received by a particular system, according to one or more embodiments of the disclosure;

FIG. 5 illustrates exemplary pseudo code for a sequence finding process that finds sequences in a sorted list of unique addresses, according to one embodiment of the disclosure;

FIG. 13 illustrates another exemplary processing platform that may be used to implement at least a portion of one or more embodiments of the disclosure.

DETAILED DESCRIPTION

Figure 1:
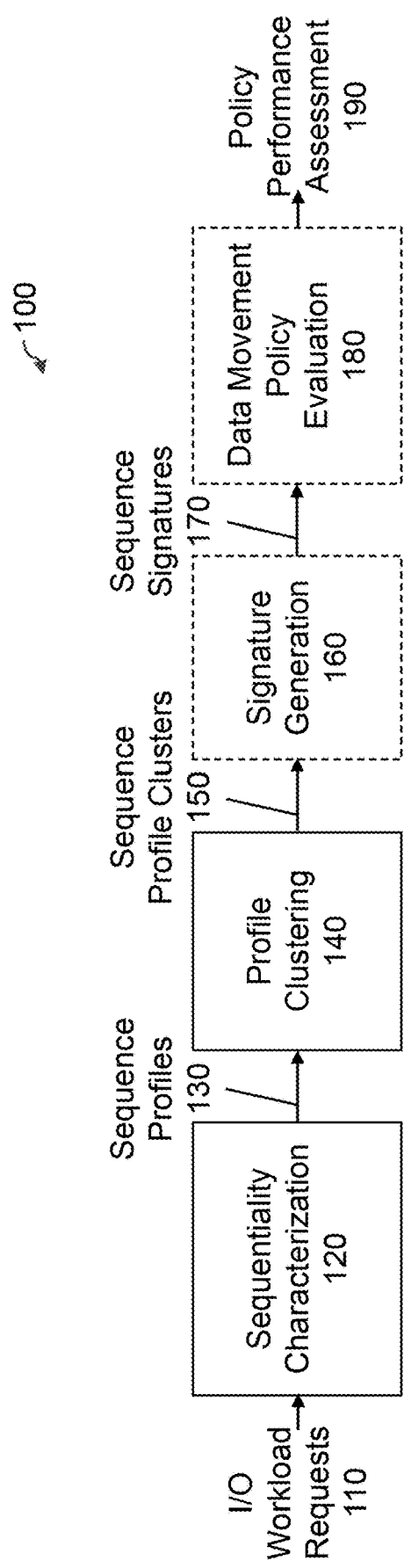
FIG. 1 illustrates an exemplary I/O workload sequentiality characterization system, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for characterizing and quantifying a sequentiality of workloads using sequentiality profiles and signatures derived from I/O workload traces.

One or more aspects of the disclosure recognize that prefetching decisions should be adaptive to the sequentiality of access patterns. The challenge, however, is characterizing and measuring sequentiality.

In one or more embodiments, techniques are provided for characterizing and quantifying the sequentiality of input/output workloads using sequentiality profiles and sequentiality signatures derived from input/output (I/O) workload traces. In some embodiments, the disclosed sequentiality profiles and sequentiality signatures may be used to create a new data movement policy and/or to evaluate a performance of existing data movement policies, such as data movement policies for prefetching, caching and/or storage tiering.

U.S. patent application Ser. No. 16/397,596, filed Apr. 29, 2019, (now U.S. Pat. No. 10,871,902), entitled "Adaptive Look-Ahead Configuration for Prefetching Data in Input/Output Operations Based on Request Size and Frequency," incorporated by reference herein in its entirety, describes techniques for automatically and adaptively estimating different look-ahead windows based on request size and frequency for each portion of the storage system (e.g., for each LUN).

As noted above, prefetching is a well-known technique to optimize cache behavior. Prefetching exploits data locality with the assumption that applications often request data residing in sequential addresses in a given address space. Namely, when a device's operating system receives a data access request at a certain address, $A_i$, the operating system retrieves not only the content of that location, but also the content of the N subsequent address locations, $\{A_{i+1}, \ldots, A_{i+N}\}$, before the application actually requests the data from those other addresses. The operating system then places the retrieved content in a cache, which, by design, is a faster media than the media where the data originally resides. If the application indeed requests data from subsequent addresses, the operating system satisfies those requests directly from the cache, instead of fetching data from the slower media at each request. The parameter N defines the number of sequential addresses that the operating system prefetches to the cache at each iteration, and it is commonly referred to as the look-ahead window.

Even though prefetching generally yields good results, prefetching is dependent on the correct choice of the look-ahead window. A trivial assumption could be to simply prefetch everything, but because the cache size tends to be much smaller than actual storage sizes, filling the cache with unnecessary data may lead to frequent cache eviction. The correct look-ahead size improves cache hits without necessarily sacrificing performance by evicting too much data. This choice, in turn, is highly dependent on how the applications that access the device traverse the address space when requesting data. It is thus reasonable to hypothesize that look-ahead windows should be adaptive to the sequentiality of access patterns. The challenge, however, is characterizing and measuring sequentiality (e.g., an important step to evaluating if a given prefetching policy is well-suited for a workload with certain sequentiality characteristics). It is also important for the fine-tuning of other policies related to improving a storage system to better serve the workloads accessing it.

In one or more embodiments, the present disclosure provides techniques for characterizing and quantifying the sequentiality of workloads via sequentiality profiles and signatures derived exclusively from I/O traces. In some embodiments, the disclosed techniques for characterizing workload sequentiality are agnostic with respect to the applications associated with such workloads. Such profiles and signatures capture various nuances (both static and dynamic) of how an application traverses an address space of a storage system. While correlated with the performance of prefetching policies, they are agnostic with respect to how those policies detect sequentiality, which is an important requirement for unbiased comparisons between policies and for the creation of new policies adapted to the characteristics of the workloads.

Storage systems typically have a single prefetching policy, with one fixed look-ahead window configuration. This is not ideal because several applications, with different data access patterns may access the storage system concurrently. Each access pattern traverses the address space of the system distinctly. For instance, some accesses might be sequential, while others might be random; some might traverse the entire address space, while others might be concentrated in a small range of addresses.

It is often challenging to determine whether a given prefetching policy is suitable for the workloads running on certain storage system. A straightforward way of measuring cache performance is by simply calculating cache hits, misses, and pollution levels. However, such measurements only indicate how the policy is responding to the workload characteristics. Alone, they cannot explain why a policy does not perform well at any given point in time.

Furthermore, each prefetching policy has its own heuristic to make prefetch decisions. Some prefetching policies, for instance, may look for sequences of addresses in the cache to decide whether to do a prefetch. Other prefetching policies, such as those described, for example, in U.S. Pat. No. 8,667,224, "Techniques for Data Prefetching," incorporated by reference herein in its entirety, and additional policies disclosed in U.S. patent application Ser. No. 16/397,596, (now U.S. Pat. No. 10,871,902), referenced above, and U.S. patent application Ser. No. 16/508,347, filed Jul. 11, 2019, (now U.S. Pat. No. 10,977,177) entitled "Real-Time Pre-Fetch Determination based on LUN-Specific Sequential Patterns," incorporated by reference herein in its entirety, and variations thereof, respectively, use frequency and size of the I/O request and find sequences of addresses in a short history of I/O requests for each LUN. While such heuristics can indicate when a policy might be too aggressive or too conservative, they do not necessarily relate to the underlying sequentiality characteristics of the workload. This lacking relation results from the fact that a policy's notion of sequentiality is directly affected by the parameterization of the policy itself. Therefore, a characterization of sequentiality that is agnostic with respect to policies' implementations is required.

As noted above, a sequence is simply a collection of sequential addresses accessed in a subsequent I/O request. However, characterizing the sequentiality of a given I/O workload tends to be more intricate than one might think. The sequentiality can be associated with an entire workload or with small temporal segments thereof, in case one wishes to capture variations in its sequentiality characteristics. Proper characterization should thus be agnostic regarding temporal aspects.

Additionally, sequentiality can be characterized in different ways. While it can be captured with a single value (e.g., average sequence length), it certainly has many nuances that a single value is not able to represent. Finding the correct representation to characterize and quantify sequentiality is a challenge.

Many applications and file types can be associated with sequentiality profiles. For instance, image, audio and video processing applications intrinsically process file content sequentially, while many data base applications are mostly random. A challenge here is how to derive sequentiality directly from how the underlying storage system is being accessed, without any knowledge about its applications and file types.

FIG. 1 illustrates an exemplary I/O workload sequentiality characterization system 100, according to an embodiment of the disclosure. As shown in FIG. 1, the exemplary I/O workload sequentiality characterization system 100 processes a set of I/O workload requests 110, typically in the form of I/O requests from storage telemetry data, as discussed further below in conjunction with FIG. 2. A sequentiality characterization stage 120 processes the I/O workload requests 110 to generate sequence profiles 130.

The sequence profiles 130 are processed by a profile clustering module 140 that clusters the sequence profiles and generates sequence profile clusters 150. The sequence profile clusters 150 are processed by a signature generation stage 160 that generates sequence signatures 170 to represent multiple, similar sequence profiles.

A data movement policy evaluation module 180 processes the sequence signatures 170 to evaluate a performance of one or more data movement policies, such as data movement policies for prefetching, caching and/or storage tiering, as noted above. The data movement policy evaluation module 180 provides a policy performance assessment 190, discussed further below.

Workloads as I/O Traces System administrators often subdivide storage systems into many logical units (LUNs), each with its own addressable space defined in logical blocks addresses (LBAs). For example, storage volumes are often divided into a number of LUNs, each with its own addressable space defined in LBAs. Enterprise-grade applications are often configured in such a way to leverage the most out of the underlying storage configuration, and sometimes even determine how the storage should be configured.

One or more embodiments of the disclosed sequentiality characterizing techniques process I/O telemetry data that indicate how applications traverse the address space of a storage system.

Some embodiments assume that the telemetry data comes in the form of I/O traces that indicate a type of I/O operation that an application issued (e.g., read or write), a size of the operation, a timestamp associated with the operation, and an indication of an address in the storage addressable space.

FIG. 2 illustrates an exemplary table of storage telemetry data 200 in the form of I/O traces for requests received by a particular system, according to one or more embodiments of the disclosure. As shown in FIG. 2, the exemplary storage telemetry data 200 comprises a file identifier (fileid) that identifies the storage system; a timestamp indicating a date and time of the request: an operation type (opn) (e.g., read, write or control); a host controller (cpu) in the system that handled the request; an identification of a logical unit (LUN) of a system (tdev); a logical block address (lba) accessed by the request in the given LUN; and a size of the operation (e.g., in number of blocks).

One or more embodiments of the present disclosure consider that the logical addressable space is segmented in blocks of contiguous LBAs, referred to as pages. A typical storage system may use pages of 256 LBAs, which is equivalent to 128 kilobytes.

The exemplary telemetry data 200 of FIG. 2 can be collected in storage systems and reveal how I/O workloads and access patterns vary with time, reflecting aspects of the seasonality of the operations associated with them.

Characterizing Sequentiality of I/O Workloads

As noted above, one or more embodiments provide techniques for characterizing the sequentiality of a given I/O workload from telemetry data. The exemplary method is based on the definition of sequentiality profiles and signatures that enable a quantification of the sequentiality of an access pattern identified by the I/O telemetry. The disclosed profiles and signatures can be associated with small and large temporal segments of the data, being able to capture more static or dynamic aspects of the sequentiality of the workload.

Finding Sequences

Figure 3:
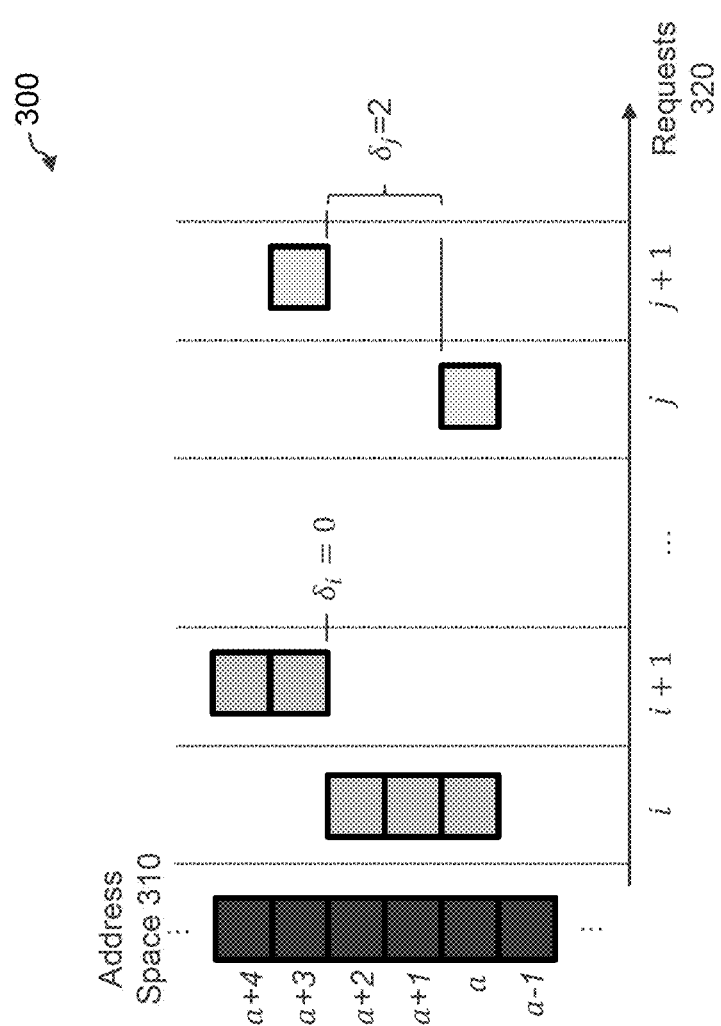
FIG. 3 illustrates a number of requests for an address space, according to some embodiments.

Initially, small sequential patterns are identified in the I/O telemetry. FIG. 3 illustrates a number of requests 300 for an address space, according to some embodiments. In the example of FIG. 3, requests i and i+1 are sequential requests, and requests j and j+1 are non-sequential requests. Strictly speaking, at least in some embodiments, two subsequent I/O requests in a given workload, $\{req_{i-1}(Address_{i-1}, Size_{i-1}), req_i(Address_i, Size_i)\}$, are sequential if and only if $\delta_i = Address_i - (Address_{i-1} + Size_{i-1}) = 0$. Therefore, a naïve method to find sequences to compute $\delta_i$ for every request and aggregate addresses for which $\delta_i = 0$.

A workload, however, may comprise several parallel processes accessing the storage across different address ranges at the same time. As a result, the recorded telemetry data, once serialized, may contain gaps in address ranges that would otherwise appear sequential.

Figure 4B:
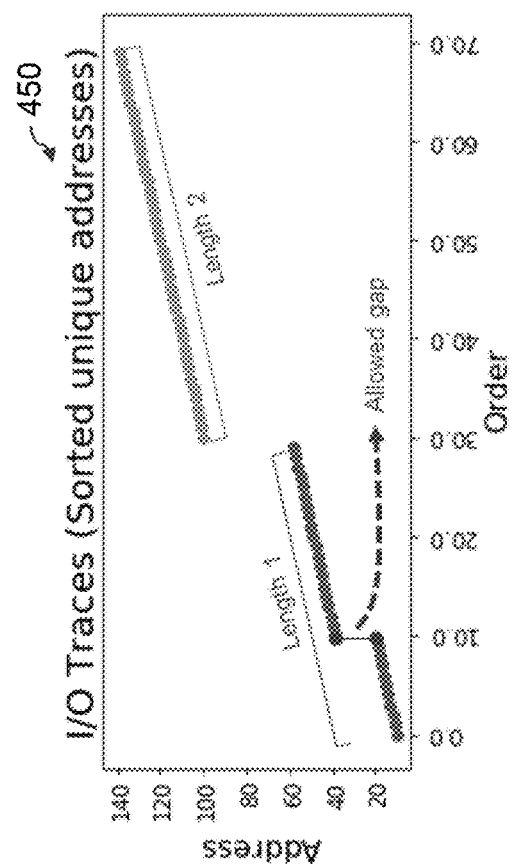
FIGS. 4A and 4B illustrate I/O traces in telemetry data, according to one or more embodiments of the disclosure.
Figure 4A:
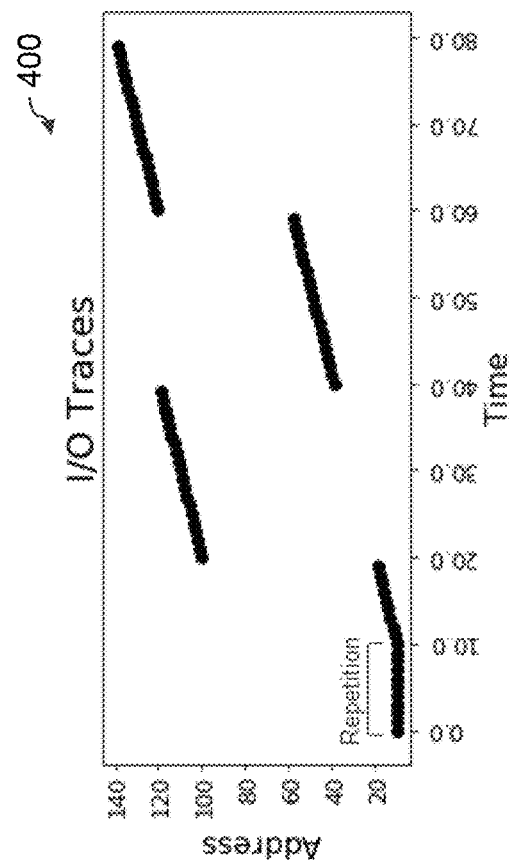

FIGS. 4A and 4B illustrate I/O traces 400, 450 in telemetry data, according to one or more embodiments of the disclosure. In the example of FIG. 4A, a set of I/O traces 400 are shown as seen in the telemetry data. In addition, the same set of traces 400 are shown as a modified set of I/O traces 450 in FIG. 4B, after a sorting by address and discarding repeated accesses to the same address. One or more aspects of the disclosure aim to compute the sequence lengths indicated in FIG. 4B.

As noted above, the recorded telemetry data, once serialized, may contain gaps in address ranges that would otherwise appear sequential, as illustrated in the set of I/O traces 400.

To make the sequence finding process easier, a short history of the last n addresses accessed in the precedent requests is maintained, per LUN of the system, and then sorted so that the temporal gaps disappear, as shown by the modified set of I/O traces 450. In this manner, the lengths of the sequences formed in this sorted segment of addresses can be collected.

Note, however, that gaps may still occur if sequences are not strictly sequential. Since a prefetching policy may still benefit from loading those addresses to cache, the sequentiality condition can be relaxed to allow some gaps of fixed sizes in the sequences. Note also that repeated accesses to the same address are discarded in some embodiments, as shown in the set of I/O traces 400. While being beneficial to any cache policy, repeated accesses do not contribute to the definition of sequences.

It is thus noted that the notion of subsequent "in time" differs from the notion of subsequent "in space". Sorting the requested addresses within the specified time window, in some embodiments, captures sequentiality in space.

FIG. 5 illustrates exemplary pseudo code for a sequence finding process 500 that finds sequences in a sorted list of unique addresses, according to one embodiment of the disclosure. In the example of FIG. 5, the exemplary pseudo code is implemented in Python. The exemplary sequence finding process 500 receives as input a sorted list of n unique addresses of a given LUN and an allowable gap, which defaults to 1. Note that, once the addresses are sorted, the sizes of the requests are no longer useful for computing $\delta_i = Address_i - (Address_{i-1} + Size_{i-1}) = 0$. As a result, in one embodiment, the allowed gap becomes the average size of the requests in the set, but other values could be used, as would be apparent to a person of ordinary skill in the art. The algorithm returns all sequences found, defined by their start address and the length.

Sequentiality Profiles

As stated above, the profiles and signatures can be associated with small and large temporal segments of the data, being able to capture more static or dynamic aspects of the sequentiality of the workload. The exact temporal aggregation over which to characterize sequentiality is application-dependent. The method disclosed in one or more embodiments of the present disclosure is completely agnostic with respect to the chosen temporal aggregation.

One way of characterizing the sequentiality of a workload (or a temporal segment thereof) could be to calculate the average sequence length of all sequences formed via the sequence finding process 500 of FIG. 5. However, a workload has many nuances that a single value cannot capture.

It may be more interesting, however, to capture the distribution of sequence lengths over periods of time. Such distribution would then represent the sequentiality profile of the workload.

Figure 6:
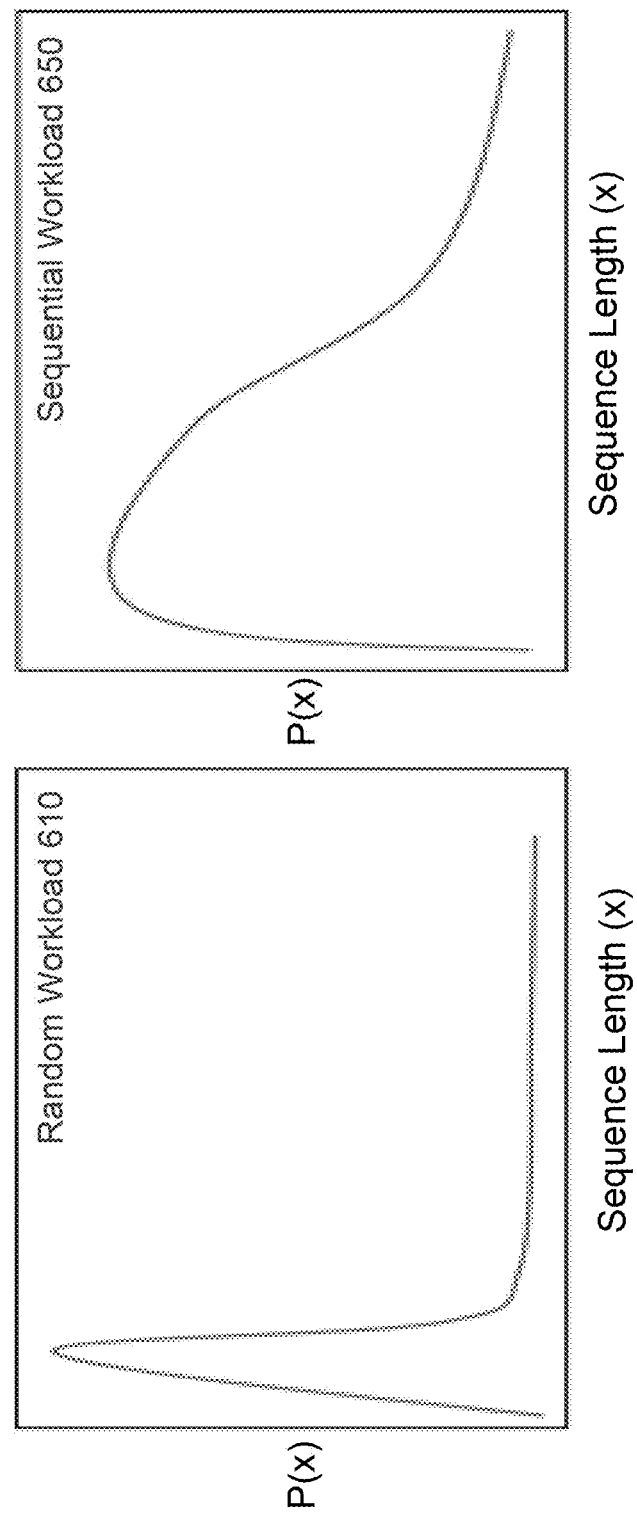
FIG. 6 illustrates two exemplary sequentiality profiles as the distribution of sequence lengths over a period of time, according to an embodiment.

FIG. 6 illustrates two exemplary sequentiality profiles 610, 650 as the distribution of sequence lengths over a period of time, according to an embodiment of the disclosure. In the example of FIG. 6, the sequentiality profile 610 corresponds to a random workload, while the sequentiality profile 650 corresponds to a sequential workload.

Generally, profiles more concentrated on the left, such as the sequentiality profile 610, represent generally random workloads. Namely, in such workloads, the likelihood of finding longer sequences is very low, and the benefits of prefetching are minimal, if any. Conversely, a sequential workload is one in which longer sequences are more likely to be found.

It has been found that high sequentiality does not tend to be the norm in I/O workloads.

Figure 7:
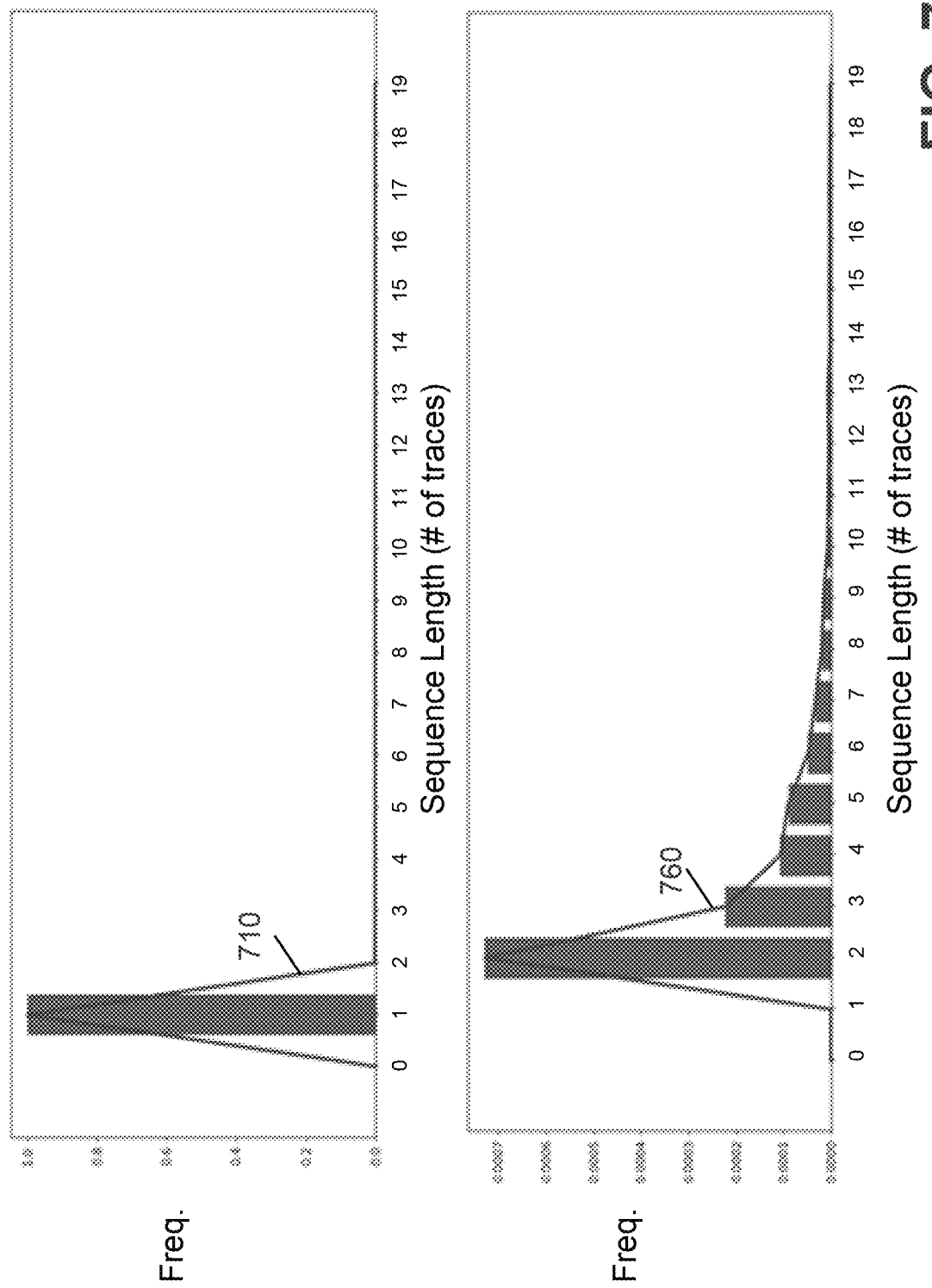
FIG. 7 illustrates two exemplary sequence profiles in practice, according to at least one embodiment.

FIG. 7 illustrates two exemplary sequence profiles 710, 760 in practice, according to at least one embodiment, based on a frequency of each sequence length. In the exemplary sequence profile 710, a dominant number of sequences has a length of one page. The exemplary sequence profile 760 comprises a profile without any sequences having a length of one page and considers sequence lengths up to 19 pages.

As shown by the exemplary sequence profile 710 in FIG. 7, sequences of length equal to one often dominate the distribution. Even when sequences are present, sequences of longer lengths are increasingly rare. Thus, in some embodiments, the disclosed sequentiality profiles consider a "clamping" value of sequence lengths. It can be shown that, for at least some use cases, sequences beyond 19 pages in length (i.e., more than 2.5 MB) are rare. Thus, the disclosed exemplary sequentiality profiles only consider sequence lengths in the interval [2, 19+), meaning that sequences longer than 19 pages are clamped at 19 pages, as shown by the exemplary sequence profile 760. More generally, clamping values tend to be application dependent.

In some embodiments, each system may have one or more sequence profiles, depending on the periods of time over which the profiles are calculated. As noted above, temporal aggregations on which to characterize sequentiality are application-dependent. One or more exemplary embodiments arbitrarily choose, without loss of generality, to characterize sequentiality within time windows of approximately one minute.

In some embodiments, a number of exemplary sequentiality profiles can be evaluated over predefined time windows of a certain system, such as one-minute windows. When the time window evaluation reveals a concentration of short sequence lengths, the system would appear to be serving a random workload. Nevertheless, for profiles having different probabilities of occurrence of sequences of length two, for example, some sections of the workload may benefit from prefetches of small sizes. Additionally, some profiles may have sequence lengths of up to five pages, for example. This would suggest that the workload includes some variations that can be exploited by different prefetching configurations.

When different storage systems are compared over time over the predefined time windows, many storage systems exhibit similar signatures. In some storage systems, sequences with odd lengths are more likely than sequences with even lengths. Such workloads can be considerably more sequential than other workloads, given the likelihood of sequences with length equal to five or above, for example, and very homogeneous. Such workloads may benefit from more aggressive prefetching policies Sequentiality Signatures While the sequentiality profiles of FIG. 6 provide a wealth of information about the characteristics of the workloads, they might add too much complexity for the interpretation of those characteristics. It has been observed that many profiles are similar intra- and inter-systems.

As a result, groups can be formed with profiles that share the same profile characteristics. In some embodiments, an exemplary grouping of similar sequentiality profiles may comprise a grouping using an ad-hoc grouping strategy.

For ease of interpretation, each of those groups of similar sequentiality profiles can be represented by a single profile, referred to herein as a sequentiality signature. In some embodiments, new and existing sequentiality profiles can be associated with such a sequentiality signature.

One objective is to have each time window of the workloads identified by one sequentiality signature. By doing this, the performance of different prefetching policies can be assessed on each sequentiality signature.

In one or more embodiments, groups of similar profiles can be created via clustering algorithms, such as a K-Means algorithm with K=8 clusters. Each sequentiality signature is the centroid of one of those clusters.

Clustering, in most cases, is an unsupervised machine learning technique, in which the solution cannot be validated with a ground truth. The biggest challenge is to find the ideal number of clusters in the solution. In the present disclosure, the sequentiality signatures are desired that are the best representatives of the sequentiality profiles in the population. The difficulty is that the sequentiality profiles can be points in a 20-dimensional space and assessing clustering quality in such a space is not straightforward.

Many techniques exist to reduce the dimensionality of the data, while preserving the information contained in it. One such technique is the T-distributed Stochastic Neighbor Embedding (t-SNE), described in, for example, L. Van der Maaten and G. Hinton, "Visualizing Data Using t-SNE," *J. of Machine Learning Research*, vol. 9, 2579-2605 (2008), incorporated by reference herein in its entirety, which embeds high-dimensional data for visualization in a low-dimensional space of two or three dimensions. The method maps high-dimensional objects to low-dimensional points in such a way that similar objects appear close to each other in the embedding. Although t-SNE is not a clustering method per se, it provides insight into how clusters can be potentially formed in the high-dimensional space.

In some embodiments, the employed clustering technique uses the t-SNE method to project the profiles as points in two dimensions. From there, the right value of K is selected. While some clustering algorithms receive K as input and group points to satisfy this restriction, others decide the best K given other parameters. The DBSCAN algorithm is an example of the latter, which has the benefit of allowing the creation of irregularly shaped clusters. See, for example, M. Ester et al., "A Density-Based Algorithm for Discovering Clusters in Large Spatial Databases with Noise," *Proc. of the Second International Conference on Knowledge Discovery and Data Mining* (*KDD*-96) (1996), incorporated by reference herein in its entirety.

On one hand, the results obtained with t-SNE and DBSCAN seem rather satisfactory. On the other hand, both algorithms have several input parameters, which directly affect the quality of the results. Setting the parameters to achieve solid and generalizable results is not an easy task. Even in a low-dimensional space, assessing cluster quality in an unsupervised fashion is still an open problem.

In the present disclosure, cluster quality is validated in some embodiments through an optimization process that considers auxiliary measurements. One of them is the average intra-cluster deviation. When signatures have a surrounding region along the main the signature line, that surrounding region represents the variability of the profiles associated with each signature, or the deviations from the cluster centroid. In general, relatively small deviations are an indication of good clustering results.

A second measurement is the silhouette of the resulting clusters. The silhouette measures whether the clustering algorithm assigned the points to the "correct" clusters. A "good" assignment is one in which the point is closer to all points of its own cluster than to points in the other clusters.

Finally, there is the choice of K itself. Although DBSCAN decides the best K, different values of input parameters of t-SNE and DBSCAN may yield different values of K. We know from experience that small K values increase intra-cluster variations and worsen the silhouette measure, leading to poor clustering results. Large K values, on the other hand, lead to the subdivision of clusters that would otherwise appear naturally together. In addition, large K values increase the overall complexity of the resulting models.

Given the considerations above, one or more embodiments employ a cost measure that will help minimize the normalized intra-cluster deviations and maximize the silhouette measure in the original high-dimensional space, while penalizing complex clustering models. Namely, $$cost(k) = normalized\_deviation(k) - \lambda * k * high\_dimension\_silhouette(k),$$

where λ is a regularization term set to 0.1, in the present disclosure.

To find the ideal value of K, a comprehensive set of experiments was performed with different parameters for t-SNE and DBSCAN. Each of those runs yields one clustering configuration, with one value of K. The best value, k*, is finally computed as the one that minimizes the cost metric, as follows:

$$k^* = \underset{k \in [8,50]}{\mathrm{argmin}\, cost}(k).$$

Figure 8:
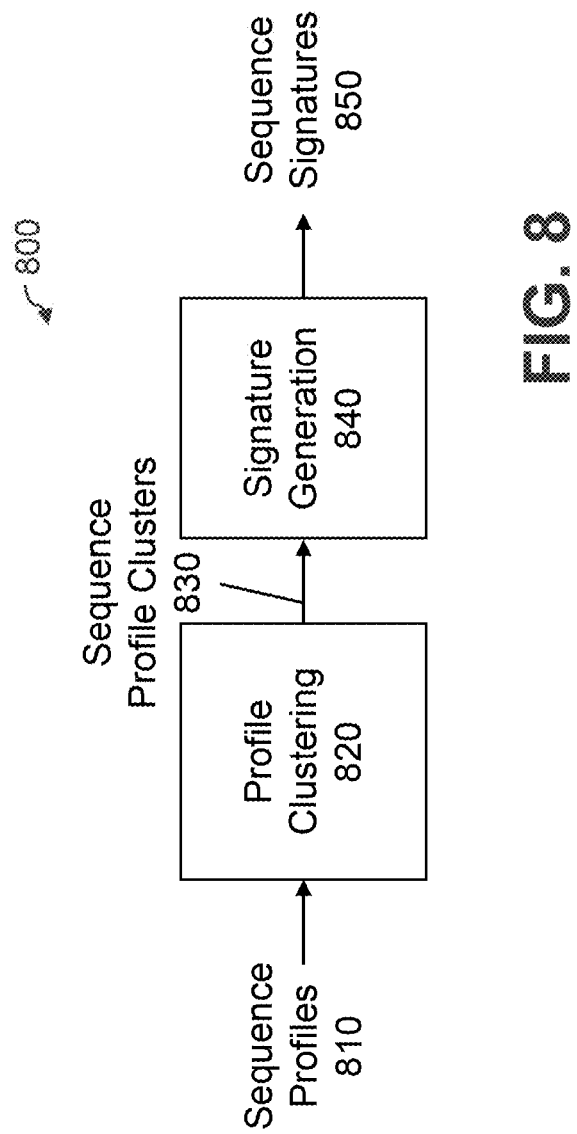
FIG. 8 illustrates a sequence signature generator, according to one or more embodiments.

FIG. 8 illustrates a sequence signature generation process 800, according to one or more embodiments. As shown in FIG. 8, the sequence signature generation process 800 applies sequence profiles 810, such as those of FIG. 6, to a profile clustering module 820 that clusters similar sequence profiles 810 for one or more I/O workloads into sequence profile clusters 830, as discussed above.

In addition, a signature generation 840 generates sequentiality signatures 850 to represent one or more sequentiality profiles within a given cluster. In some embodiments, a given sequentiality signature 850 is a centroid of the given cluster.

Quantifying Sequentiality

Figure 9:
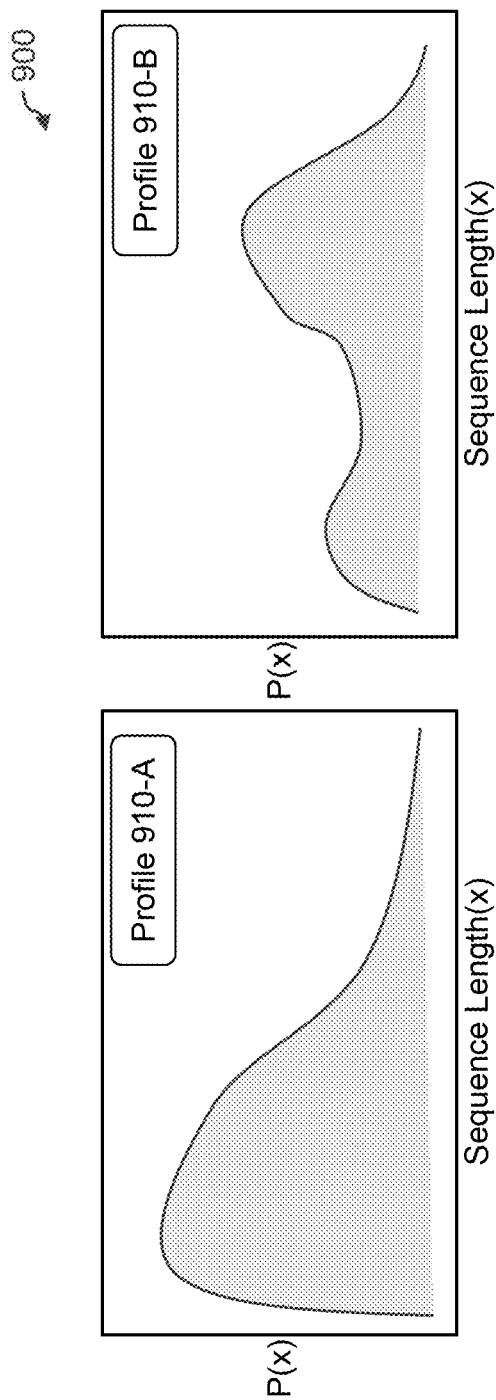
FIG. 9 illustrates an example of a ranking of sequentiality of workloads, according to one or more embodiments of the disclosure.

As stated above, the disclosed sequentiality profiles and signatures provide a wealth of information about the sequentiality characteristics of I/O workloads. Alone, however, they cannot deterministically rank workloads in terms of their sequentiality. FIG. 9 illustrates an example of a ranking of sequentiality of workloads 900, according to one or more embodiments of the disclosure. Consider whether profile 910-A is more sequential than profile 910-B, and by how much.

Arguably, ranking workloads is arbitrary and of less importance in comparison with the insights obtained from the analysis of the sequentiality profiles 910. However, such ranking can be useful to understand, in a more tractable fashion, other aspects of workloads deemed random or sequential.

Therefore, some embodiments of the disclosure quantify the sequentiality of a workload, given its profile or signature, as follows:

$$seq = \sum_{i=2}^{c} x_i * i^w$$

where c is a clamping value (the maximum sequence length considered) and w is a sequence weight (the exponential weight attributed to sequences of size i). In the present case, an exemplary clamping value of 19 was employed, with a weight of 3.

The disclosed measure represents a weighted form of the area under the profile curve. It gives increasing weight to longer sequences so that profiles containing them result in a higher value for the measure.

Figure 10:
FIG. 10 illustrates an exemplary data movement policy evaluator, according to some embodiments.

FIG. 10 illustrates an exemplary data movement policy evaluator 1000, according to some embodiments. The exemplary data movement policy evaluator 1000 processes sequence signatures of clusters 1010, to determine a per-policy and per-cluster performance assessment 1030. For example, as discussed herein, the data movement policy evaluator 1000 may evaluate a hit ratio and/or a pollution of a cache policy for a give workload.

Figure 11:
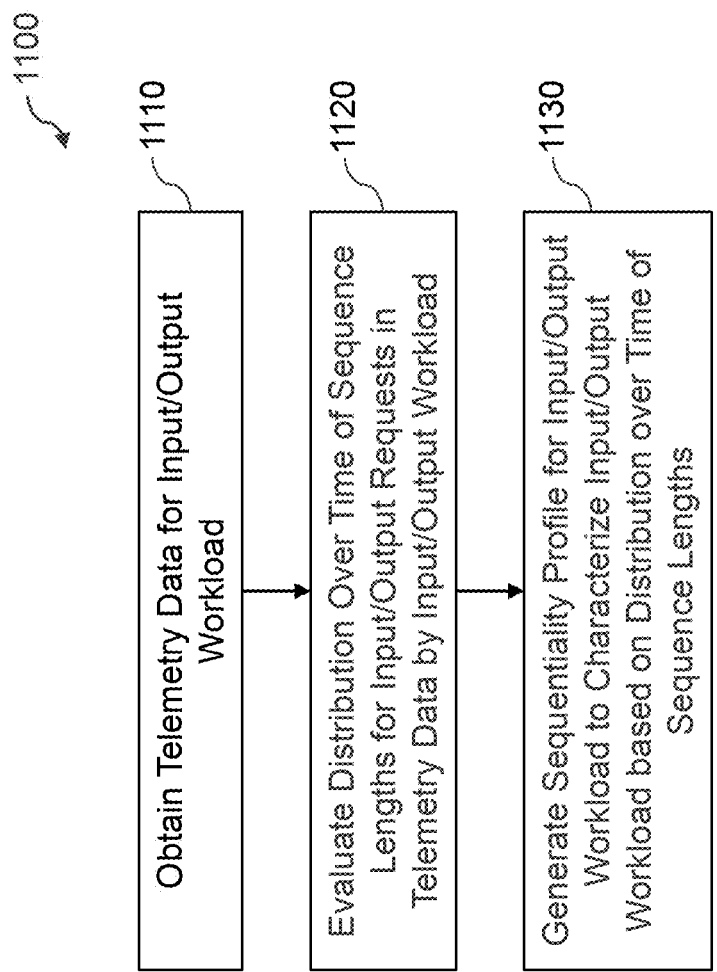
FIG. 11 is a flow chart illustrating an exemplary implementation of a sequentiality characterization process, according to one embodiment of the disclosure.

FIG. 11 is a flow chart illustrating an exemplary implementation of a sequentiality characterization process 1100, according to one embodiment of the disclosure. As shown in FIG. 11, the exemplary sequentiality characterization process 1100 initially obtains Telemetry Data during step 1110 for an I/O workload.

During step 1120, the exemplary sequentiality characterization process 1100 evaluates a distribution over time of sequence lengths for input/output requests in the telemetry data by the I/O workload.

Finally, a sequentiality profile is generated during step 1130 for the I/O workload to characterize the I/O workload based on the distribution over time of sequence lengths.

In one or more embodiments, multiple sequentiality profiles for one or more I/O workloads are clustered into one of a plurality of clusters. A sequentiality signature can be generated to represent the sequentiality profiles within a given cluster. In this manner, a performance of a data movement policy can be evaluated with respect to the sequentiality signature of the given cluster.

In some implementations, the sequentiality profiles and signatures can be used to assess the performance of different prefetching policies on a real I/O trace database from a number of exemplary storage systems, comprising, for example, 30 hours of operations combined.

The simulation techniques disclosed in U.S. patent application Ser. No. 16/263,135, filed Jan. 31, 2019, entitled "Adaptive Look-Ahead Configuration for Prefetching Data in Input/Output Operations," incorporated by reference herein in its entirety, can be employed in one or more embodiments to replay the I/O traces while applying the policies and gathered statistics about hit and pollution ratios. Various prefetching policies can be assessed, including variations of the policy described, for example, in U.S. Pat. No. 8,667,224, "Techniques for Data Prefetching," incorporated by reference herein in its entirety, and additional policies disclosed in U.S. patent application Ser. No. 16/397, 596, (now U.S. Pat. No. 10,871,902), referenced above, and U.S. patent application Ser. No. 16/508,347, (now U.S. Pat. No. 10,977,177), filed Jul. 11, 2019, entitled "Real-Time Pre-Fetch Determination based on LUN-Specific Sequential Patterns," incorporated by reference herein in its entirety, and variations thereof, and a baseline LRU policy, without prefetching.

In an exemplary implementation, the telemetry was segmented into one-minute windows and the sequentiality profiles and signatures were computed for each window, following the steps described above. Finally, the performance of the prefetching policies mentioned above was evaluated with respect to the different sequentiality signatures. This helped conclude how sequentiality characteristics influence prefetching performance.

The sequentiality profiles were obtained with the clustering procedure described above. In one exemplary analysis, 17 signatures were obtained, which was the value of K that minimized the disclosed cost measure. A richness was observed of the representation embedded in the signatures. Some of them were almost flat, which relates to random workloads. Others concentrated around length=2, which revealed the presence of short sequences. Finally, some signatures had peaks spread across the entire length range. Curiously, some peaks appear on odd sequence lengths, which reveals an unusual pattern of sequentiality. As shown below, generic prefetching policies are not able to fully exploit those patterns and generate considerable cache pollution.

The average hit ratios of the prefetching policies were evaluated relative to the sequentiality signatures. A heatmap was sorted in increasing order of sequentiality, as determined by the quantification method described above.

For an instance of Policy-X-Y, X indicates how many pages the policy brings to the cache for each prefetch (higher X means more aggressiveness), while Y indicates how many pages preceding the address of the current request must be in the cache for a prefetch to be triggered (lower Y means more aggressiveness). In PolicyROI-Y, Y has the same meaning as in Policy-X-Y, while the amount of prefetching is adaptive with respect to a LUN's frequency and average size of requests. In PolicySegDeltaLRU-X-Y-50-0.25, higher X and lower Y mean more prefetching (i.e., more aggressiveness). Finally, PolicySegDeltaROI-Y-50-0.25 combines the adaptive prefetching of PolicyROI with the Y in PolicySegDeltaLRU to decide whether to trigger a prefetch.

The computed hit ratios (e.g., average hit ratios across all time windows associated with a sequentiality signature) are the number of prefetched pages that suffered a hit divided by the total number of prefetched pages. It was noted that more aggressive policies indeed increase the hit ratios in workloads that are more sequential. This evidences the correlation between the sequentiality signatures and the expected performance of the policies, irrespective of the prefetching heuristics they implement. Had the sequentiality profiles not correctly characterized the workload, such correlation would not be evident.

Consider a signature with a relatively high sequentiality, according to the disclosed quantification method. All policies performed considerably worse than on another signature that was less sequential. Although the former signature, with the relatively high sequentiality, presents sequentiality across most of the length range, which quantifies sequentiality as high, it peaks at length=2. Arguably, this makes the workload more similar to other signatures that are less sequential and peak at length=2 as well. In the end, the prefetching policies did not improve the performance of cache as would have been expected for a sequential workload. Such observation would probably prompt some level of fine tuning of the policies if the workload had high priority.

With similar reasoning, the performance of another signature label was higher than its neighbors with similar levels of sequentiality. Other signatures were observed with higher sequentiality, albeit appearing almost flat. This happened because the latter signatures have a few occurrences of long sequences, which make them score high in the sequentiality quantification. The former signature, on the other hand, covered a spectrum of shorter sequences, which causes the return of the prefetches to be higher than in the other cases. This demonstrates that no measure of sequentiality quantification is perfect, but the one disclosed in this invention seemed to cover the vast majority of cases.

The average pollution ratios of the prefetching policies can also be observed relative to the sequentiality signatures. The pollution ratios computed are the number of prefetched pages that left the cache without any hits divided by the total number of prefetched pages. The values are the average pollution ratios across all time windows associated with a sequentiality signature.

Analysis of pollution roughly results in the same conclusions as those obtained from the analysis of hits. Policy-2-1 generated high pollution levels in a signature. This happened because this policy configuration prefetches two pages into the cache every time one precedent page address relative to the requested address is still in the cache. The referred signature had a small peak at length=2. When the policy detects that the precedent address is in the cache, half of the sequence has already been consumed. Still, the policy prefetches two pages into the cache, which end up not being used, generating pollution. The exact same reasoning applies to Policy-2-* in another signature. Despite the occurrence of sequences of different lengths, the signature has many sequences of length=2.

One or more embodiments of the disclosure thus provide techniques for characterizing the sequentiality of input/output workloads using sequentiality profiles and sequentiality signatures. In some embodiments, the disclosed sequentiality profiles and sequentiality signatures may be used to evaluate a performance of data movement policies, such as data movement policies for prefetching, caching and/or storage tiering.

In some embodiments, the sequentiality of I/O workloads are characterized by computing the distribution of sequence lengths found over periods of time. One benefit of the disclosed sequentiality profiles is that they enable an assessment of the performance of prefetching policies and other data movement policies while being completely agnostic with respect to their implementations. The profiles also capture nuances of sequentiality that cannot be represented with a single value.

In addition, in one or more embodiments, a sequentiality signature is provided to represent a group of similar sequentiality profiles. The signatures facilitate the interpretation of the sequentiality profiles present in a workload and allow a classification of new profiles. In at least one embodiment, a clustering technique is employed to group similar profiles and to derive sequentiality signatures. One exemplary clustering technique is based on a combination of t-SNE, to project profiles onto a two-dimensional space, and DBSCAN, to enable the generation of clusters of irregular shapes on that space. The substantially optimal cluster configuration is found through a process that minimizes a cost measure based on the normalized intra-cluster distribution and on the silhouette measure of the clusters in the original high-dimensional space.

The sequentiality is optionally quantified via a weight area under the curve of the sequentiality profile or signature. Such measure gives more weight to longer sequences appearing in the profile or signature.

One or more embodiments of the disclosure provide improved methods, apparatus and computer program products for characterizing and quantifying a sequentiality of workloads using sequentiality profiles and signatures derived from I/O workload traces. The foregoing applications and associated embodiments should be considered as illustrative only, and numerous other embodiments can be configured using the techniques disclosed herein, in a wide variety of different applications.

It should also be understood that the disclosed sequentiality characterizing techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for characterizing and quantifying a sequentiality of workloads using sequentiality profiles and signatures derived from I/O workload traces may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a sequentiality characterizing engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based sequentiality characterizing platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. These platforms may also be used to implement at least portions of other information processing systems in other embodiments.

Figure 12:
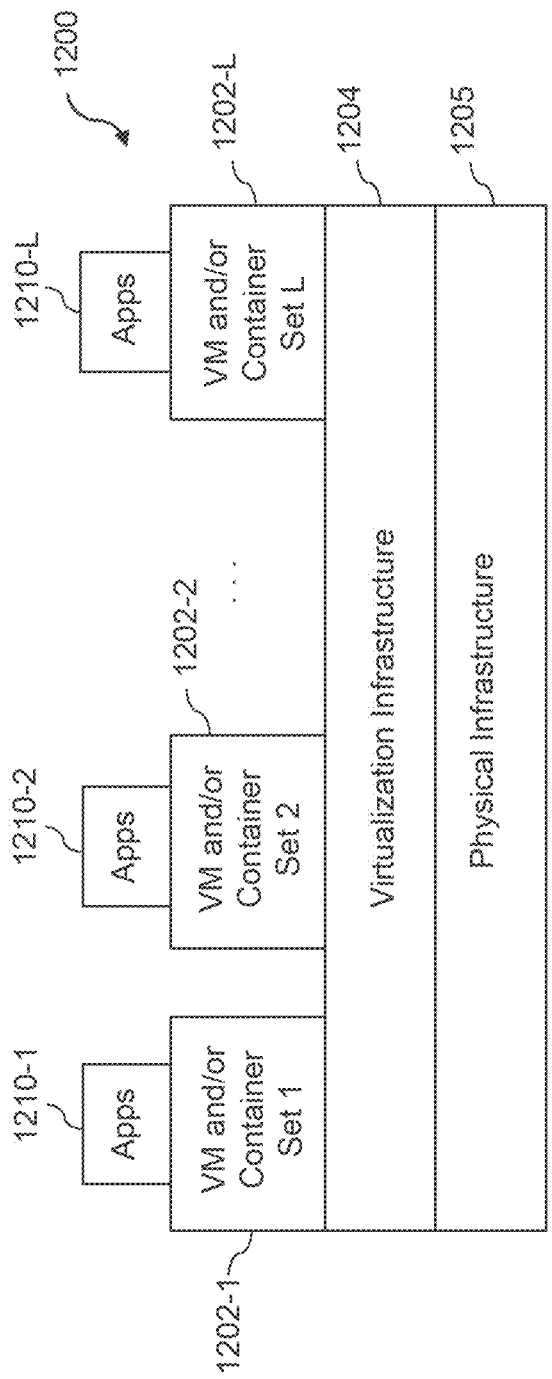
FIG. 12 illustrates an exemplary processing platform that may be used to implement at least a portion of one or more embodiments of the disclosure comprising a cloud infrastructure.

FIG. 12 shows an example processing platform comprising cloud infrastructure 1200. The cloud infrastructure 1200 comprises a combination of physical and virtual processing resources that may be utilized to implement at least a portion of an information processing system. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. Such implementations can provide sequentiality characterizing functionality of the type described above for one or more processes running on a given one of the VMs. For example, each of the VMs can implement sequentiality characterizing control logic and associated sequentiality profile and signature generation techniques for providing sequentiality characterizing functionality for one or more processes running on that particular VM.

An example of a hypervisor platform that may be used to implement a hypervisor within the virtualization infrastructure 1204 is the VMware® vSphere® which may have an associated virtual infrastructure management system such as the VMware® vCenter™. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system. Such implementations can provide sequentiality characterizing functionality of the type described above for one or more processes running on different ones of the containers. For example, a container host device supporting multiple containers of one or more container sets can implement one or more instances of sequentiality characterizing control logic and associated sequentiality profile and signature generation techniques for providing sequentiality characterizing functionality.

As is apparent from the above, one or more of the processing modules or other components of the disclosed sequentiality characterizing system may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises at least a portion of the given system and includes a plurality of processing devices, denoted 1302-1, 1302-2, 1302-3, . . . 1302-K, which communicate with one another over a network 1304. The network 1304 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1302-1 in the processing platform 1300 comprises a processor 1310 coupled to a memory 1312. The processor 1310 may comprise a microprocessor, a microcontroller, an application specific integrated circuit (ASIC), a field programmable gate array (FPGA) or other type of processing circuitry, as well as portions or combinations of such circuitry elements, and the memory 1312, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the given system may include additional or alternative processing platforms, as well as numerous distinct processing platforms in any combination, with each such platform comprising one or more computers, storage devices or other processing devices.

Multiple elements of an information processing system may be collectively implemented on a common processing platform of the type shown in FIG. 12 or 13, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining telemetry data for an input/output workload of a storage system, wherein the input/output workload comprises a plurality of input/output requests related to data stored by the storage system;
    evaluating a distribution over time of sequence lengths for the input/output requests in the telemetry data by the input/output workload; and
    generating a sequentiality profile for the input/output workload to characterize the input/output workload based at least in part on the distribution over time of the sequence lengths, wherein the sequentiality profile indicates a probability of each of a plurality of sequence lengths;
    clustering a plurality of sequentiality profiles for one or more input/output workloads into a plurality of clusters;
    generating a sequentiality signature to represent one or more sequentiality profiles within a given cluster of the plurality of clusters; and initiating an adjustment of one or more of a prefetch amount and a prefetch trigger condition of the at least one data movement policy by evaluating a quantification of a sequentiality of the input/output workload using the sequentiality signature of the given cluster, wherein the quantification characterizes a degree of the sequentiality of the input/output workload and wherein an amount of the adjustment to the prefetch amount directly correlates with the quantification and an amount of the adjustment to the prefetch trigger condition inversely correlates with the quantification;

wherein the method is performed by at least one processing device comprising a processor coupled to a memory.

2. The method of claim 1, wherein the evaluating the distribution over time of sequence lengths for input/output requests comprises determining if two subsequent input/output requests are sequential.

3. The method of claim 2, wherein the determining if two subsequent input/output requests are sequential comprises allowing a predefined gap between subsequent input/output request addresses.

4. The method of claim 1, wherein the evaluating the distribution over time of sequence lengths for input/output requests further comprises sorting the input/output requests by address and discarding repeated accesses to the same address.

5. The method of claim 1, wherein the evaluating the distribution over time of sequence lengths for subsequent input/output requests employs a clamping value comprising a maximum sequence length.

6. The method of claim 1, wherein the sequentiality signature is a centroid of the given cluster.

7. The method of claim 1, further comprising evaluating a quality of one or more of the plurality of clusters based at least in part on one or more of an average intra-cluster deviation of at least one cluster and a silhouette of the plurality of clusters.

8. The method of claim 1, further comprising evaluating at least one performance metric, wherein the at least one performance metric comprises one or more of a hit ratio, a miss ratio and a pollution ratio with respect to the sequentiality signature of the given cluster.

9. The method of claim 1, further comprising quantifying wherein the quantification of the sequentiality of the input/output workload is based at least in part on an area under the curve of one or more of the sequentiality profile and the sequentiality signature.

10. The method of claim 1, wherein the clustering comprises a projection of the plurality of sequentiality profiles from an original space onto another space and a generation of clusters of irregular shape on the another space.

11. The method of claim 1, wherein the evaluating the distribution over time of sequence lengths comprises discarding sequence lengths shorter than one or more of a predefined value and a precomputed minimal value.

12. The method of claim 1, wherein the input/output workload comprises a workload for one or more logical storage units.

13. An apparatus comprising:
at least one processing device comprising a processor coupled to a memory;
the at least one processing device being configured to implement the following steps:
obtaining telemetry data for an input/output workload of a storage system, wherein the input/output workload comprises a plurality of input/output requests related to data stored by the storage system;
evaluating a distribution over time of sequence lengths for the input/output requests in the telemetry data by the input/output workload; and
generating a sequentiality profile for the input/output workload to characterize the input/output workload based at least in part on the distribution over time of the sequence lengths, wherein the sequentiality profile indicates a probability of each of a plurality of sequence lengths;
clustering a plurality of sequentiality profiles for one or more input/output workloads into a plurality of clusters;
generating a sequentiality signature to represent one or more sequentiality profiles within a given cluster of the plurality of clusters; and
initiating an adjustment of one or more of a prefetch amount and a prefetch trigger condition of the at least one data movement policy by evaluating a quantification of a sequentiality of the input/output workload using the sequentiality signature of the given cluster, wherein the quantification characterizes a degree of the sequentiality of the input/output workload and wherein an amount of the adjustment to the prefetch amount directly correlates with the quantification and an amount of the adjustment to the prefetch trigger condition inversely correlates with the quantification.

14. The apparatus of claim 13, further comprising evaluating a quality of one or more of the plurality of clusters based at least in part on one or more of an average intra-cluster deviation of at least one cluster and a silhouette of the plurality of clusters.

15. The apparatus of claim 13, wherein the quantification of the sequentiality of the input/output workload is based at least in part on an area under the curve of one or more of the sequentiality profile and the sequentiality signature.

16. A non-transitory processor-readable storage medium having stored therein program code of one or more software programs, wherein the program code when executed by at least one processing device causes the at least one processing device to perform the following steps:
obtaining telemetry data for an input/output workload of a storage system, wherein the input/output workload comprises a plurality of input/output requests related to data stored by the storage system;
evaluating a distribution over time of sequence lengths for the input/output requests in the telemetry data by the input/output workload; and
generating a sequentiality profile for the input/output workload to characterize the input/output workload based at least in part on the distribution over time of the sequence lengths, wherein the sequentiality profile indicates a probability of each of a plurality of sequence lengths;
clustering a plurality of sequentiality profiles for one or more input/output workloads into a plurality of clusters;
generating a sequentiality signature to represent one or more sequentiality profiles within a given cluster of the plurality of clusters; and
initiating an adjustment of one or more of a prefetch amount and a prefetch trigger condition of the at least one data movement policy by evaluating a quantification of a sequentiality of the input/output workload using the sequentiality signature of the given cluster, wherein the quantification characterizes a degree of the sequentiality of the input/output workload and wherein an amount of the adjustment to the prefetch amount directly correlates with the quantification and an amount of the adjustment to the prefetch trigger condition inversely correlates with the quantification.

17. The method of claim 1, wherein the prefetch amount comprises a size of a look-ahead window.

18. The apparatus of claim 13, wherein the prefetch amount comprises a size of a look-ahead window.

19. The apparatus of claim 13, further comprising evaluating at least one performance metric, wherein the at least one performance metric comprises one or more of a hit ratio, a miss ratio and a pollution ratio with respect to the sequentiality signature of the given cluster.

20. The non-transitory processor-readable storage medium of claim 16, further comprising evaluating at least one performance metric, wherein the at least one performance metric comprises one or more of a hit ratio, a miss ratio and a pollution ratio with respect to the sequentiality signature of the given cluster.

* * * * *

UNITED STATES PATENT AND TRADEMARK OFFICE
CERTIFICATE OF CORRECTION

PATENT NO.       : 11,182,321 B2
APPLICATION NO.  : 16/671617
DATED            : November 23, 2021
INVENTOR(S)      : Rômulo Teixeira de Abreu Pinho et al.

Page 1 of 1

It is certified that error appears in the above-identified patent and that said Letters Patent is hereby corrected as shown below:

In the Claims

Column 17, Lines 45-46, in Claim 9, replace "9. The method of claim 1, further comprising quantifying wherein the quantification of the sequentiality of the input/" with -- 9. The method of claim 1, wherein the quantification of the sequentiality of the input/ --

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*